US010215557B2

(12) United States Patent
Takao et al.

(10) Patent No.: US 10,215,557 B2
(45) Date of Patent: Feb. 26, 2019

(54) DISTANCE IMAGE ACQUISITION APPARATUS AND DISTANCE IMAGE ACQUISITION METHOD

(71) Applicant: FUJIFILM Corporation, Tokyo (JP)

(72) Inventors: Hiroaki Takao, Saitama (JP); Takeshi Misawa, Saitama (JP); Takeshi Kamiya, Saitama (JP); Tomonori Masuda, Saitama (JP); Koudai Fujita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/561,772

(22) PCT Filed: Nov. 11, 2015

(86) PCT No.: PCT/JP2015/081775
§ 371 (c)(1),
(2) Date: Sep. 26, 2017

(87) PCT Pub. No.: WO2016/157600
PCT Pub. Date: Oct. 6, 2016

(65) Prior Publication Data
US 2018/0080761 A1    Mar. 22, 2018

(30) Foreign Application Priority Data

Mar. 30, 2015 (JP) ................. 2015-069130

(51) Int. Cl.
G01B 11/25 (2006.01)
G01S 17/89 (2006.01)
G06T 7/254 (2017.01)
G06T 7/11 (2017.01)
(Continued)

(52) U.S. Cl.
CPC ........... G01B 11/25 (2013.01); G01C 3/085 (2013.01); G01S 17/023 (2013.01); G01S 17/08 (2013.01);
(Continued)

(58) Field of Classification Search
CPC ........... G01B 11/25; G06T 7/254; G01S 17/08
See application file for complete search history.

(56) References Cited

U.S. PATENT DOCUMENTS

2012/0194650 A1    8/2012    Izadi et al.
2013/0038882 A1    2/2013    Umeda et al.

FOREIGN PATENT DOCUMENTS

JP    2005-221333 A    8/2005
JP    2011-169701 A    9/2011
JP    2014-115107 A    6/2014

OTHER PUBLICATIONS

International Search Report (Form PCT/ISA/210) issued in International Application No. PCT/JP2015/081775 dated Feb. 2, 2016, with an English translation thereof.
(Continued)

Primary Examiner — Maurice Smith
(74) Attorney, Agent, or Firm — Birch, Stewart, Kolasch & Birch, LLP

(57) ABSTRACT

Disclosed are a distance image acquisition apparatus and a distance image acquisition method capable of acquiring a distance image with satisfactory accuracy based on a first pattern projected from a host apparatus even in a case where patterns of structured light having the same shape are projected simultaneously from the host apparatus and another apparatus. A distance image acquisition apparatus (10) includes a projection unit (12) which projects a pattern of structured light, a light modulation unit (22) which modulates a switching timing of projection and non-projection of the pattern with a code, an imaging unit (14) which is provided in parallel with and apart from the projection unit (12) by a baseline length, performs imaging in synchronization with a projection period and a non-projection period of the pattern, and generates a first captured image captured in the projection period of the pattern and a second captured
(Continued)

image captured in the non-projection period of the pattern, a differential image generation unit (20D) which generates a differential image of the first captured image and the second captured image, a pattern extraction unit (20A) which extracts the pattern from the differential image, and a distance image acquisition unit (20B) which acquires a distance image indicating a distance of a subject within a distance measurement region based on the pattern extracted by the pattern extraction unit (20A).

6 Claims, 14 Drawing Sheets

(51) Int. Cl.
    *G01S 17/08*        (2006.01)
    *G01C 3/08*         (2006.01)
    *G01S 17/02*        (2006.01)

(52) U.S. Cl.
    CPC ............... *G01S 17/89* (2013.01); *G06T 7/11* (2017.01); *G06T 7/254* (2017.01)

(56) References Cited

OTHER PUBLICATIONS

Written Opinion of the International Searching Authority issued in International Application No. PCT/JP2015/081775 dated Feb. 2, 2016, together with an English translation thereof.
Decision to Grant a Patent for corresponding Japanese Application No. 2017-509156, dated Jun. 7, 2018, with English translation.

DISTANCE IMAGE ACQUISITION APPARATUS AND DISTANCE IMAGE ACQUISITION METHOD

BACKGROUND OF THE INVENTION

1. Field of the Invention

The present invention relates to a distance image acquisition apparatus and a distance image acquisition method, and in particular, to a technique for projecting structured light distributed in a two-dimensional manner with respect to a subject within a distance measurement region and acquiring a distance image indicating a distance of the subject.

2. Description of the Related Art

Hitherto, this kind of distance image acquisition apparatus projects a dot pattern of structured light distributed in a two-dimensional manner with respect to a subject within a distance measurement region from a projection unit, images the subject with an imaging unit, and acquires a first image including the dot pattern reflected from the subject. Furthermore, the distance image acquisition apparatus images the subject with the imaging unit without projecting a dot pattern from the projection unit, acquires a second image to be a background of the dot pattern, subtracts the second image from the first image, and calculates and acquires the distance image (three-dimensional distance information) based on a subtraction result using a triangulation method (JP2011-169701A).

JP2014-115107A describes that one distance measurement apparatus comprises a plurality of projection units, and a plurality of projection units perform projection one by one in sequence to perform imaging or pattern light projected from a plurality of projection units is made to have different colors such that patterns projected from a plurality of projection units are not confused in an imaging unit.

SUMMARY OF THE INVENTION

In the distance image acquisition apparatus described in JP2011-169701A, in a case where a distance measurement of the same subject is performed simultaneously with a plurality of distance image acquisition apparatuses, dot patterns respectively projected from a plurality of distance image acquisition apparatuses are mixed, and there is a problem in that the distance image cannot be acquired. There is a case where a distance measurement of an object having such a size that a distance image cannot be acquired with one distance image acquisition apparatus should be performed simultaneously with a plurality of distance image acquisition apparatuses, or a case where a user himself or herself uses the distance image acquisition apparatus without knowing that another person is using the distance image acquisition apparatus. In particular, in a case where a distance image is used for other purposes without being directly displayed or the like, and the user himself or herself is unaware of distance image acquisition being performed, there is a high possibility that the distance image acquisition apparatus is used simultaneously at the same place.

The technique described in JP2014-115107A is a technique for, in a case where a plurality of projection units are provided in one apparatus, avoiding confusion between patterns in the imaging unit of one apparatus, and is difficult to be applied to a case where patterns are projected from a plurality of projection units respectively provided in a plurality of apparatuses.

The reason is as follows. As described in JP2014-115107A, in a case where a plurality of projection units are provided in one apparatus, a projection timing or a wavelength bandwidth is instructed from a central processing unit (CPU), which performs integral control in one apparatus, to each of a plurality of projection units, whereby it is possible to easily perform control of time division or wavelength bandwidth division (referred to as frequency division) of a plurality of projection units. Meanwhile, in a case where a projection unit is provided in each of a plurality of independent apparatuses, the projection timing or the wavelength bandwidth cannot be directly instructed from a CPU of a host apparatus to the projection units of another apparatus. Assuming a configuration in which a master apparatus which integrally controls a plurality of apparatuses is newly provided and the projection timing or the wavelength bandwidth is instructed from the master apparatus to each of a plurality of apparatuses as a slave apparatus through communication, since the master apparatus needs to be newly provided and the independence of each apparatus is impaired, in particular, the above-described technique is difficult to be applied to a terminal which is freely used by the user.

The invention has been accomplished in consideration of such a situation, and an object of the invention is to provide a distance image acquisition apparatus and a distance image acquisition method capable of acquiring a distance image with satisfactory accuracy based on a pattern projected from a host apparatus even in a case where patterns of structured light having the same shape are projected simultaneously from the host apparatus and another apparatus.

In order to attain the above-described object, a distance image acquisition apparatus according to an aspect of the invention comprises a projection unit which projects a first pattern of structured light distributed in a two-dimensional manner with respect to a subject within a distance measurement region, a light modulation unit which modulates a switching timing of projection and non-projection of the first pattern projected from the projection unit with a code, an imaging unit which is provided in parallel with and apart from the projection unit by a baseline length, performs imaging in synchronization with a projection period and a non-projection period of the first pattern, and generates a plurality of captured images including the first pattern reflected from the subject, the plurality of captured images including a first captured image captured in the projection period of the first pattern and a second captured image captured in the non-projection period of the first pattern, a differential image generation unit which generates a differential image of the first captured image captured in the projection period and the second captured image captured in the non-projection period, a pattern extraction unit which extracts the first pattern from the differential image, and a distance image acquisition unit which acquires a distance image indicating a distance of the subject within the distance measurement region based on the first pattern extracted by the pattern extraction unit.

According to this configuration, the switching timing of projection and non-projection of the first pattern projected from the projection unit is modulated with the code by the light modulation unit, and the first captured image captured in the projection period of the first pattern and the second captured image captured in the non-projection period of the first pattern are generated by performing imaging with the imaging unit in synchronization with the projection period and the non-projection period of the first pattern, the differential image of the first captured image and the second captured image is generated by the differential image generation unit, and the first pattern (the pattern projected from the projection unit of the host apparatus) is extracted from the differential image by the pattern extraction unit. For this reason, even in a case where the patterns of structured light having the same shape are projected simultaneously from the host apparatus and the another apparatus, it is possible to acquire a distance image with satisfactory accuracy based on only the first pattern projected from the host apparatus.

The expression that the imaging unit "generates" the first and second "captured images" includes a case where an imaging signal is read, that is, electric charge is simply read from a light receiving element of the imaging unit as an imaging signal.

According to another aspect of the invention, in the distance image acquisition apparatus, it is preferable that the light modulation unit modulates the switching timing of projection and non-projection of the first pattern with a random code. That is, since the switching timing of projection and non-projection of the first pattern is modulated with the random code, even in a case where the patterns of structured light having the same shape are projected simultaneously from the host apparatus and the another apparatus, it is possible to reliably make the switching timings of projection and non-projection of the patterns different.

According to a further aspect of the invention, it is preferable that the distance image acquisition apparatus further comprises a determination unit which determines whether or not a second pattern is projected from another distance image imaging apparatus, and in a case where the determination unit determines that the second pattern is projected from the another distance image imaging apparatus, the light modulation unit performs modulation on the first pattern projected from the projection unit. That is, during a period in which the second pattern is not projected from another distance image imaging apparatus, it is possible to generate a distance image without modulating the first pattern projected from the projection unit.

According to still another aspect of the invention, it is preferable that the distance image acquisition apparatus further comprises a beacon information reception unit which receives beacon information transmitted from the another distance image acquisition apparatus, the beacon information indicating that the second pattern is projected from the another distance image acquisition apparatus, and in a case where the beacon information reception unit receives the beacon information, the determination unit determines that the second pattern is projected from the another distance image imaging apparatus. That is, during a period in which there is no another apparatus which transmits beacon information within a communicable range of the beacon information, it is possible to generate a distance image without modulating the first pattern projected from the projection unit.

According to still another aspect of the invention, in the distance image acquisition apparatus, it is preferable that the first pattern and the second pattern are dot patterns, and when the number of dots of a dot pattern detected from a captured image captured by the imaging unit exceeds the number of dots of the first pattern projected from the projection unit, the determination unit determines that the second pattern is projected from the another distance image imaging apparatus. That is, it is possible to easily determine whether or not the second pattern is projected from another apparatus.

According to still another aspect of the invention, in the distance image acquisition apparatus, it is preferable that the imaging unit performs exposure in an exposure period corresponding to a frame rate of the distance image, and the light modulation unit modulates the switching timing of projection and non-projection of the first pattern in synchronization with start and end timings of the exposure period of the imaging unit.

A distance image acquisition method according to still another aspect of the invention comprises a step of modulating a switching timing of projection and non-projection of a first pattern of structured light distributed in a two-dimensional manner with respect to a subject within a distance measurement region with a code and making a projection unit project the first pattern, a step of performing imaging in synchronization with a projection period and a non-projection period of the first pattern with an imaging unit provided in parallel with and apart from the projection unit by a baseline length and generating a plurality of captured images including the first pattern reflected from the subject, the plurality of captured images including a first captured image captured in the projection period of the first pattern and a second captured image captured in the non-projection period of the first pattern, a step of generating a differential image of the first captured image captured in the projection period and the second captured image captured in the non-projection period, a step of extracting the first pattern from the differential image, and a step of acquiring a distance image indicating a distance of the subject within the distance measurement region based on the extracted first pattern.

According to the invention, even in a case where the patterns of structured light having the same shape are projected simultaneously from the host apparatus and another apparatus, it is possible to acquire a distance image with satisfactory accuracy based on the pattern projected from the host apparatus.

DESCRIPTION OF THE PREFERRED EMBODIMENTS

Hereinafter, an embodiment of a distance image acquisition apparatus and a distance image acquisition method according to the invention will be described referring to the accompanying drawings.

First Embodiment

Figure 1:
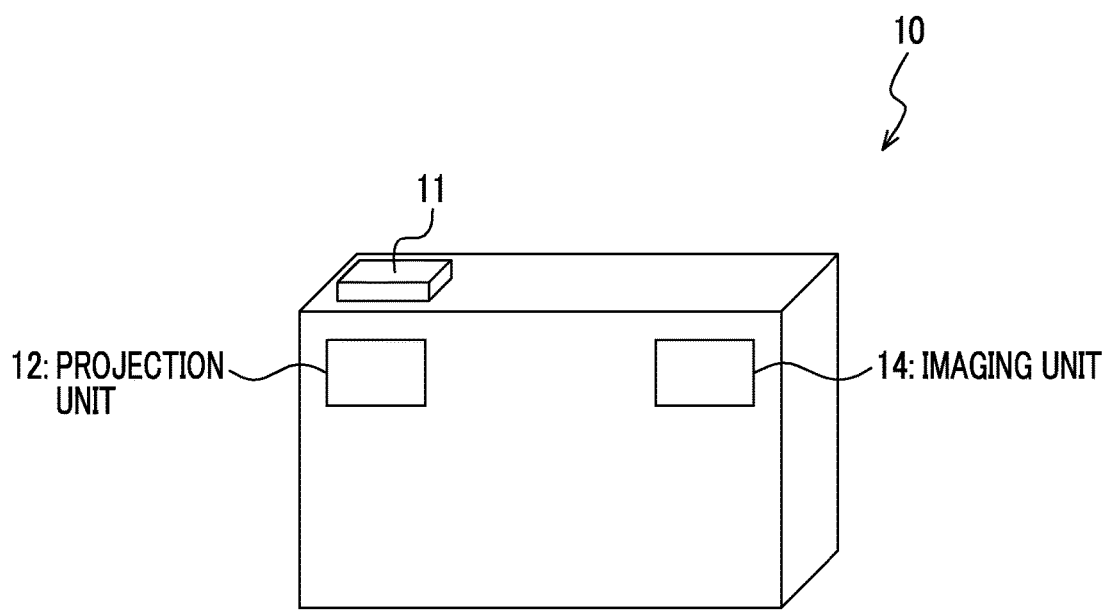
FIG. 1 is an appearance diagram showing a first embodiment of a distance image acquisition apparatus according to the invention.

FIG. 1 is an appearance diagram showing the appearance of an example of a distance image acquisition apparatus 10 according to the invention.

As shown in FIG. 1, the distance image acquisition apparatus 10 has a projection unit 12 and an imaging unit 14. Though will be described below in detail, in a case where an imaging instruction input by the operation of the shutter button 11 is applied, the distance image acquisition apparatus 10 acquires a distance image indicating a distance (depth information) of a subject within an imaging region (distance measurement region).

Figure 3:
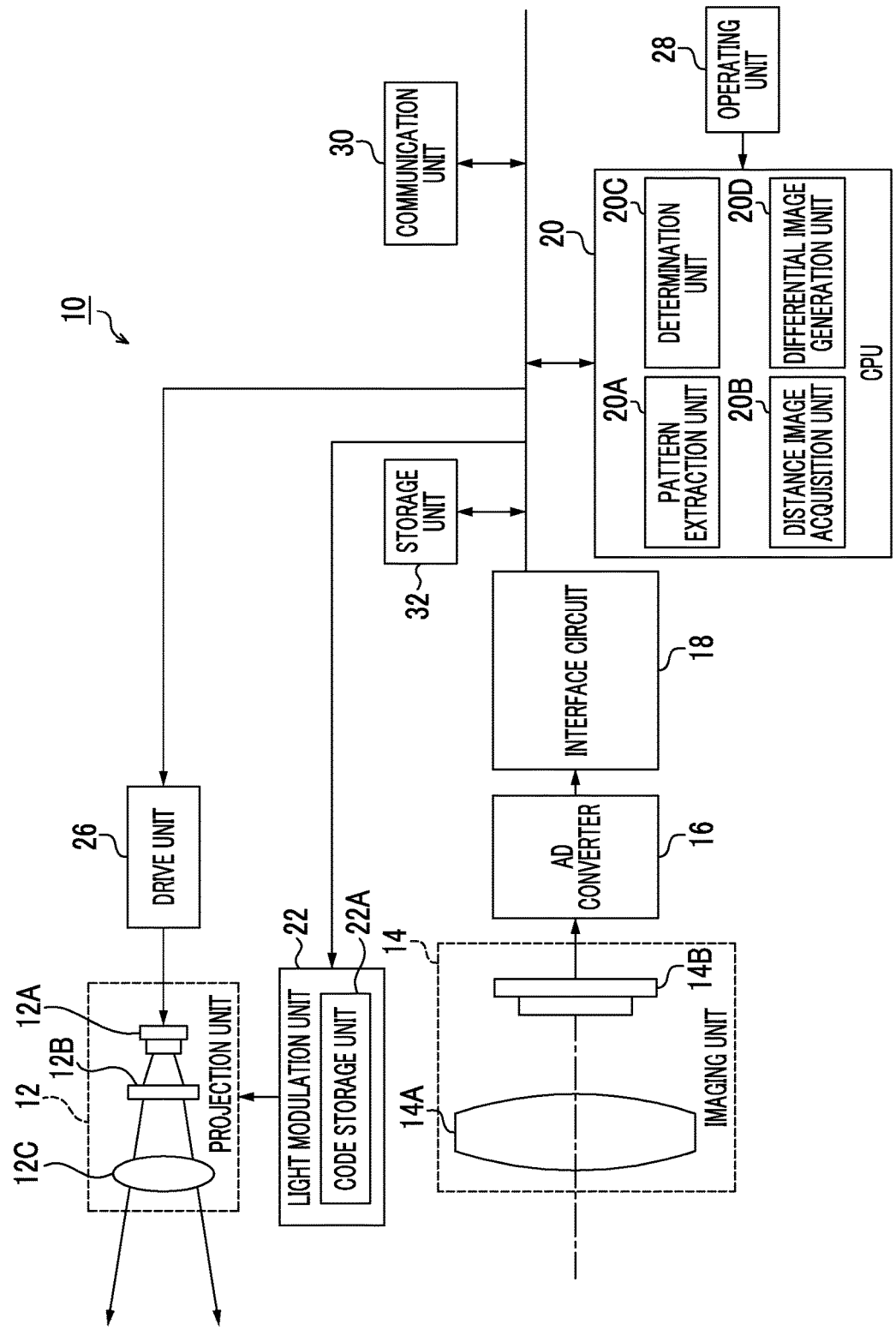
FIG. 3 is a block diagram showing an internal configuration example of the distance image acquisition apparatus of the first embodiment.

The distance image acquisition apparatus 10 has a static image mode in which a distance image for one frame is acquired like static image capturing and a video mode in which a distance image continuous at a predetermined frame rate (for example, 30 frames/second, 60 frames/second) is acquired like video capturing. The static image mode and the video mode can be appropriately selected by an operation of a mode selection unit of an operating unit 28 (FIG. 3). Then, in a case where a shutter button 11 is operated with one push when the static image mode is selected, a distance image for one frame is acquired. In a case where the shutter button 11 is operated with one push when the video mode is selected, acquisition of a distance image continuous at a predetermined frame rate is started, and in a case where the shutter button 11 is operated with one push again, distance image acquisition is stopped.

Figure 2:
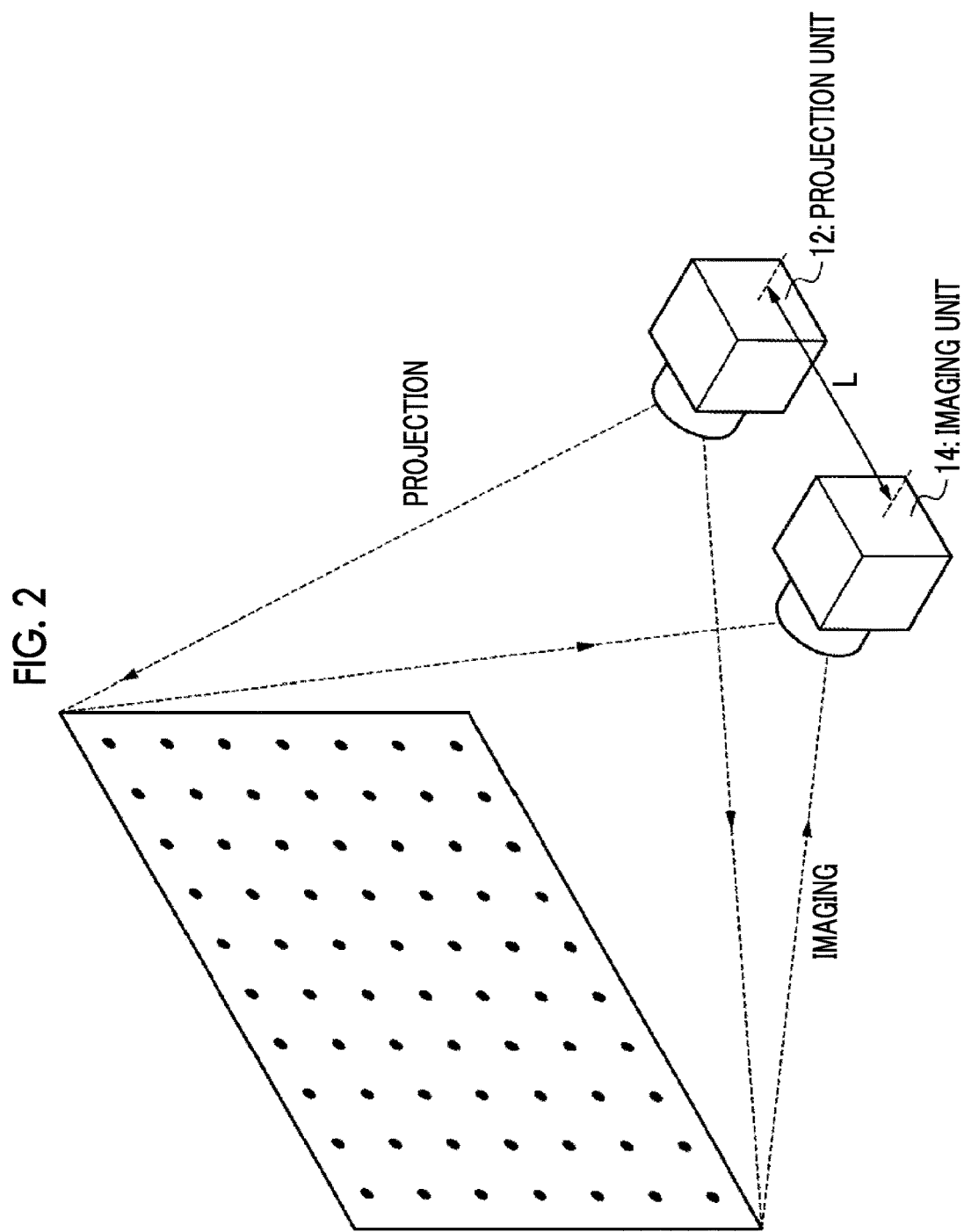
FIG. 2 is a diagram illustrating the principle of distance image acquisition.

FIG. 2 is a diagram illustrating the principle of distance image acquisition in the distance image acquisition apparatus 10.

As shown in FIG. 2, at the time of acquisition of the distance image, the projection unit 12 projects a pattern (first pattern) of structured light distributed in a two-dimensional manner with respect to a subject within a distance measurement region. In this embodiment, as the first pattern of structured light, a matrix-shaped dot pattern is projected onto the subject. Hereinafter, the first pattern of structured light projected from the projection unit 12 may be referred to as a "first dot pattern".

The imaging unit 14 captures an image including the first dot pattern reflected from the subject. As shown in FIG. 2, the imaging unit 14 is provided in parallel with and apart from the projection unit 12 by a baseline length L, and parallax according to the distance of the subject is generated between the corresponding dots of the first dot pattern projected from the projection unit 12 and the first dot pattern imaged by the imaging unit 14. Accordingly, it is possible to obtain the distance image indicating the distance of the subject based on a light receiving position (not shown) of each dot of the first dot pattern projected from the projection unit 12 on an image sensor imaged by the imaging unit 14 using a triangulation method.

As shown in FIG. 2, although the projection unit 12 of this embodiment projects the matrix-shaped first dot pattern, the invention is not limited thereto, and the projection unit 12 may project a dot pattern in which a dot interval is random (pseudo random) or a mesh-shaped pattern.

FIG. 3 is a block diagram showing an internal configuration example of the distance image acquisition apparatus 10.

The distance image acquisition apparatus 10 comprises, in addition to the projection unit 12 and the imaging unit 14 described above, an analog-to-digital (AD) converter 16, an interface circuit 18, a central processing unit (CPU) 20, a light modulation unit 22, a drive unit 26, an operating unit 28, a communication unit 30, and a storage unit 32.

The projection unit 12 has a near infrared light emitting diode (near infrared LED) 12A, a diffraction optical element 12B, and a projection lens 12C functioning as a projection optical system.

The diffraction optical element 12B functions as an element which converts a light intensity distribution using a diffraction phenomenon of light. In this example, near infrared light emitted from the near infrared LED 12A enters the diffraction optical element 12B, and the diffraction optical element 12B converts near infrared light to the matrix-shaped first dot pattern shown in FIG. 2. The projection lens 12C projects the first dot pattern of near infrared light converted by the diffraction optical element 12B onto the subject within the distance measurement region, which is the same as the imaging region (distance measurement region) of the imaging unit 14.

The imaging unit 14 is constituted of an imaging lens 14A and an image sensor 14B. The imaging lens 14A images reflected light (a light image including the first dot pattern projected from the projection unit 12 and reflected from the subject) from the subject on the image sensor 14B.

The image sensor 14B is constituted of a complementary metal-oxide semiconductor (CMOS) driver which has a vertical driver, a horizontal driver, and the like, and a CMOS type image sensor which is driven by a timing generator. The image sensor 14B is not limited to a CMOS type, and may be an XY address type or charge coupled device (CCD) type image sensor.

The image sensor 14B has a plurality of light receiving elements (photodiodes) arranged in a two-dimensional manner, and is provided with, on an incidence surface of a plurality of light receiving elements, a band-pass filter which transmits only a wavelength bandwidth of the first dot pattern of near infrared light projected from the projection unit 12 or a visible light cut filter which eliminates visible light. With this, a plurality of light receiving elements of the image sensor 14B function as pixels having sensitivity to near infrared light.

In the image sensor 14B, an exposure period is controlled according to a timing signal (shutter control signal) applied from the timing generator (not shown), and electric charge corresponding to the amount of near infrared light entering in the exposure period is accumulated in each light receiving element of the image sensor 14B. Then, a pixel signal (an analog signal corresponding to electric charge accumulated in each pixel) according to the amount of incident light of the first dot pattern reflected from the subject is read from the image sensor 14B. In a case where the subject is irradiated with ambient light and a component in the wavelength bandwidth of near infrared light is included in ambient light, the component in the wavelength bandwidth of near infrared light out of ambient light is included in the pixel signal as a noise signal.

The analog signal read from the image sensor 14B is converted to a digital signal (image data) by the AD converter 16, and is loaded on the CPU 20 by way of the interface circuit 18 functioning as an image input controller. A CMOS type image sensor may include an AD converter, and in this case, the AD converter 16 may be omitted.

Though details will be described below, the CPU 20 has a function as a device control unit which performs exposure control of the distance image acquisition apparatus 10 and integrally controls the respective units, such as the light modulation unit 22 and the drive unit 26 according to an instruction input on the operating unit 28, and a function as a pattern extraction unit 20A, a distance image acquisition unit 20B, a determination unit 20C, and a differential image generation unit 20D.

The pattern extraction unit 20A extracts the first dot pattern from the captured image as image data input through the interface circuit 18. For example, the pattern extraction unit 20A extracts image data (binary image data) indicating only the first dot pattern by setting a proper threshold value and binarizing input image data based on the threshold value.

The distance image acquisition unit 20B acquires (generates) the distance image indicating the distance of the subject within the distance measurement region based on the first dot pattern extracted by the pattern extraction unit 20A. For example, the distance image acquisition unit 20B obtains the position (for example, the position of the center of gravity of each dot) of each dot of the first dot pattern on the image sensor 14B based on binary image data indicating only the first dot pattern, calculates the distance of the subject for each dot based on the obtained position of each dot of the first dot pattern on the image sensor 14B, and thus, acquires (generates) the distance image indicating the distance of the subject within the distance measurement region. While the distance image is two-dimensional distance information indicating the distance of the subject within the distance measurement region, the distance image can be visually recognized as an image by substituting the distance information with a brightness value or color information corresponding to the distance.

Figure 15:
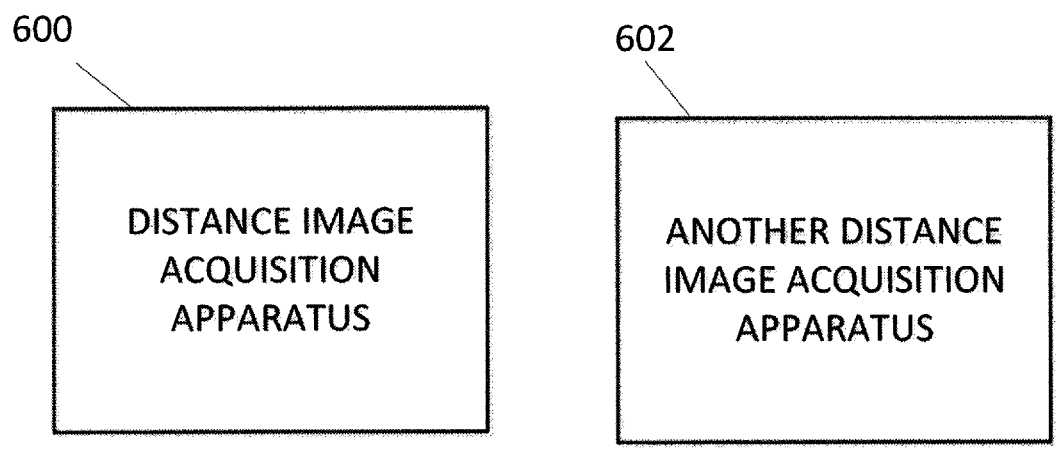
FIG. 15 is a block diagram showing the distance image acquisition apparatus and another distance image acquisition apparatus.

The determination unit 20C is a part which determines whether or not a pattern (second pattern) of structured light is projected from another distance image acquisition apparatus (hereinafter, simply referred to as "another apparatus"), the another distance image acquisition 602 apparatus and the distance image acquisition apparatus 600 being depicted in FIG. 15. Hereinafter, a case where a matrix-shaped dot pattern is projected from another apparatus onto the subject as the second pattern of structured light will be described as an example, and the second pattern of structured light projected from the another apparatus is referred to as a "second dot pattern". That is, the determination unit 20C determines whether or not the second dot pattern projected from another apparatus is included in the captured image.

The differential image generation unit 20D generates a differential image of the first captured image captured in the projection period of the first dot pattern and the second captured image captured in the non-projection period of the first dot pattern. The light modulation unit 22 temporally modulates the first dot pattern projected from the projection unit 12. The drive unit 26 drives the projection unit 12 according to an instruction from the CPU 20. The operating unit 28 includes a power switch, a shutter button 11, a mode selection unit, and the like, and an instruction input on the operating unit 28 is applied to the CPU 20.

The communication unit 30 is a short-distance wireless communication unit which performs wireless communication with another apparatus or an access point, and functions as a beacon information reception unit which receives beacon information transmitted from another apparatus directly or through the access point. The determination unit 20C can determine whether or not there is another apparatus within a communicable range (that is, whether or not the second dot pattern is projected from another apparatus) according to a reception result of the beacon information from the communication unit 30. The beacon information can include information indicating the shape of the pattern (second dot pattern) of structured light projected from another apparatus, and modulation information (in particular, a code indicating a switching timing of projection and non-projection of the second dot pattern) indicating a modulation content of temporal modulation of the second dot pattern. In this case, the determination unit 20C can acquire information (the shape of the second dot pattern, the modulation information indicating the modulation content of temporal modulation, or the like) relating to the second dot pattern projected from another apparatus based on the beacon information received through the communication unit 30.

Next, a main part of a configuration for acquiring a distance image in a state in which the second dot pattern is projected from another apparatus will be described.

Figure 4:
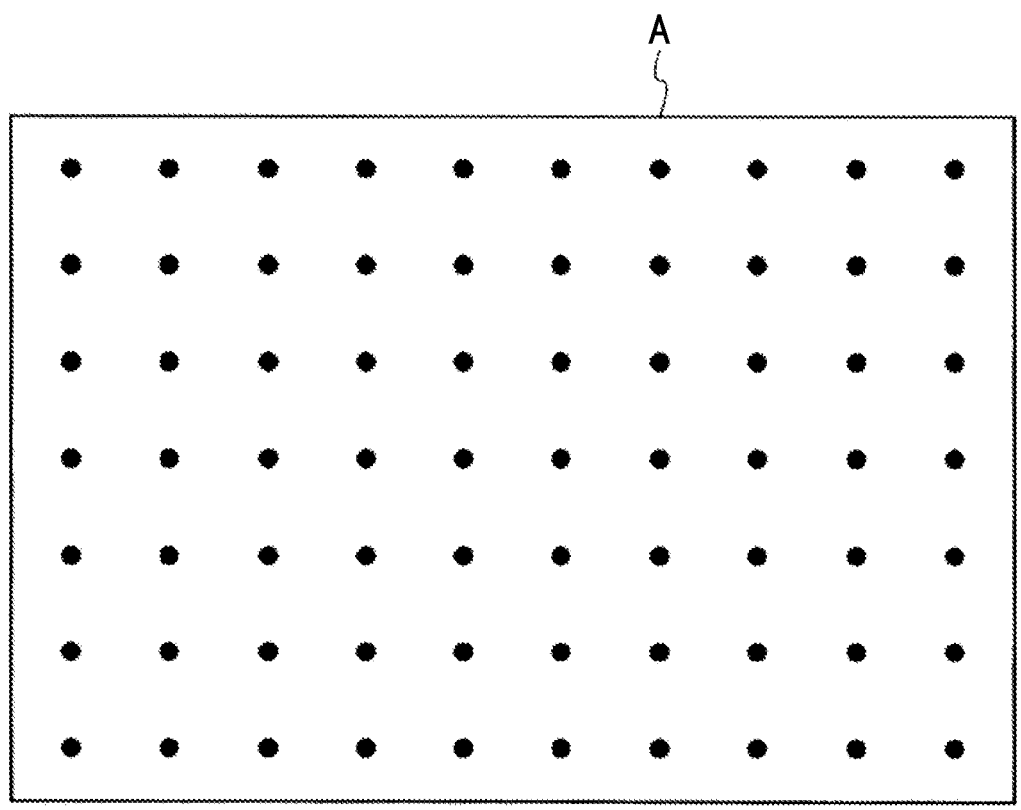
FIG. 4 is a diagram showing an example of a captured image obtained by imaging in a state in which a dot pattern is not projected from another apparatus when a dot pattern is projected from a host apparatus.
Figure 5:
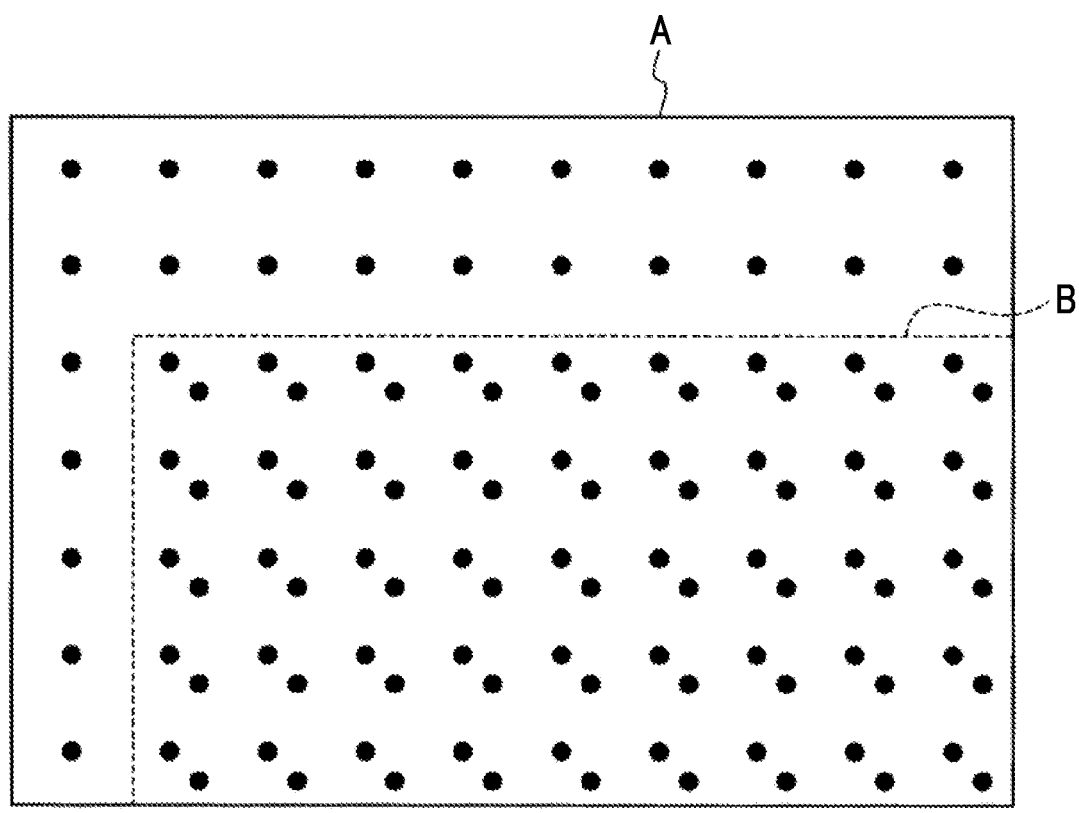
FIG. 5 is a diagram showing an example of a captured image obtained by imaging in a state in which a dot pattern is projected from another apparatus when a dot pattern is projected from the host apparatus.

FIG. 4 is a diagram showing an example of a captured image obtained by imaging with the imaging unit 14 in a state in which a dot pattern is not projected from another apparatus when a dot pattern is projected from the host apparatus. Since the captured image shown in FIG. 4 includes only the first dot pattern projected from the projection unit 12 of the host apparatus and reflected from the subject within a distance measurement region A, it is possible to extract the first dot pattern by performing simple image processing, such as the binarization processing using the above-described threshold. However, in a case where the second dot pattern is projected from another apparatus when the first dot pattern is projected from the host apparatus, as shown in FIG. 5, since an overlap region B where first dot pattern and the second dot pattern overlap each other is present in the distance measurement region A of the captured image obtained by imaging with the imaging unit 14, and the first dot pattern and the second dot pattern have the same dot shape, it is difficult to extract the first dot pattern from the captured image. Furthermore, since the host apparatus and another apparatus are independent separate distance image acquisition apparatuses, the CPU 20 of the host apparatus is difficult to directly control the timing of pattern projection with respect to the projection unit of another apparatus. Accordingly, the distance image acquisition apparatus 10 of this embodiment extracts only the first dot pattern from the captured image with the following configuration even in a state in which the second dot pattern is projected from another apparatus.

The projection unit 12 projects the first dot pattern with respect to the subject within the distance measurement region. The imaging unit 14 performs imaging in synchronization with the projection period and the non-projection period of the first dot pattern, and generates a plurality of captured images including the first dot pattern reflected from the subject. A plurality of captured images include the first captured image captured in the projection period of the first dot pattern and the second captured image captured in the non-projection period of the first dot pattern. The light modulation unit 22 modulates the switching timing of projection and non-projection of the first dot pattern projected from the projection unit 12 with the code. The differential image generation unit 20D generates the differential image of the first captured image captured in the projection period of the first dot pattern and the second captured image captured in the non-projection period of the first dot pattern. The pattern extraction unit 20A extracts the first pattern from the differential image. The distance image acquisition unit 20B acquires the distance image indicating the distance of the subject within the distance measurement region based on the first pattern extracted by the pattern extraction unit 20A.

Next, codes for use in modulation of a switching timing of projection and non-projection of a pattern will be described referring to FIG. 6.

Figure 6:
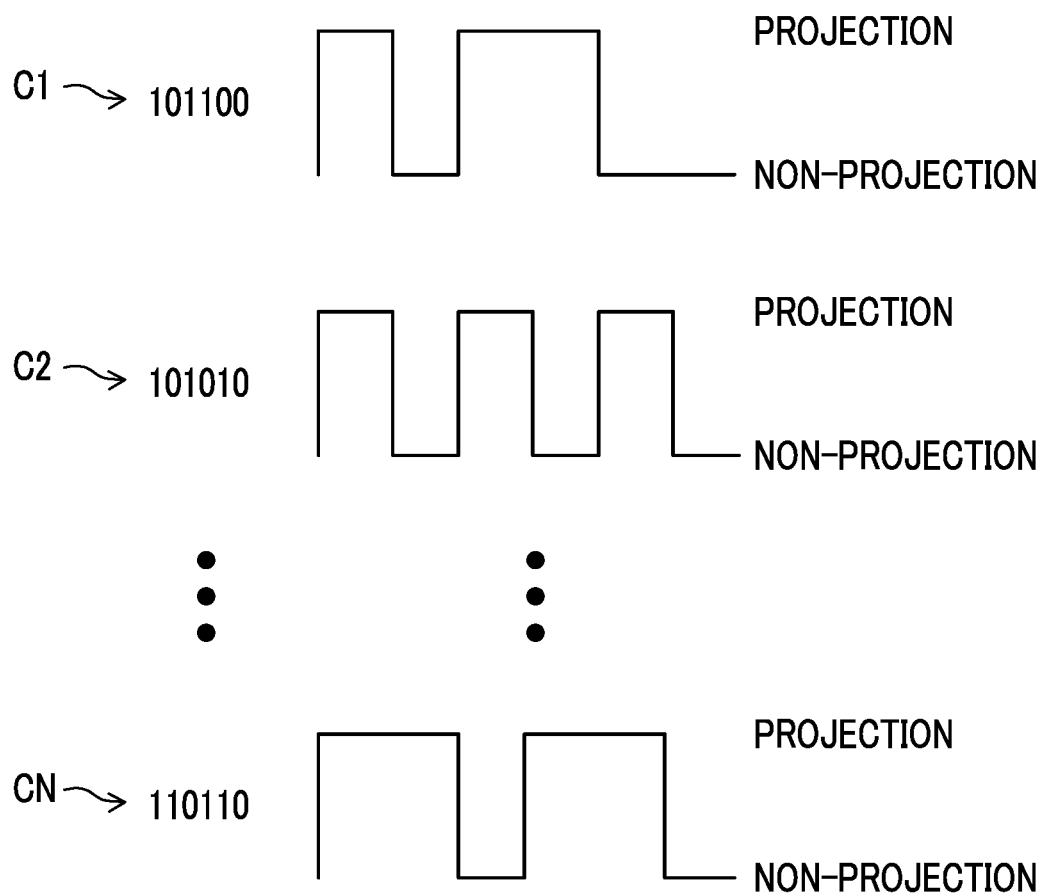
FIG. 6 is an explanatory view of codes for use in modulation of a switching timing of projection and non-projection of a pattern.

Codes C1 to CN shown on the left side of FIG. 6 are information indicating the switching timing of projection and non-projection of the first dot pattern projected from projection unit 12 as shown on the right side of the drawing. In this example, the codes are stored in advance in a code storage unit 22A of the light modulation unit 22, and the light modulation unit 22 modulates the switching timing of projection and non-projection of the first dot pattern projected from the projection unit 12 according to the code read from the code storage unit 22A. In FIG. 6, for ease of understanding, although the codes C1 to CN having a code length of six bits are shown, the code length is not particularly limited. A set of codes having different code lengths may be used. However, in a case of the video mode in which a distance image is acquired continuously, it is preferable that the code length is short.

Figure 7:
FIG. 7 is a first explanatory view illustrating dots when dot patterns are mixed.

Next, as shown in FIG. 7, extraction of only a first dot pattern DP1 in a case where a first dot pattern DP1 projected from the host apparatus and a second dot pattern DP2 projected from another apparatus are included in a captured image will be described with examples of specific codes.

First, a case where the switching timing of projection and non-projection of the first dot pattern DP1 is modulated with the code C1 as shown in an (A) portion of FIG. 8, and the switching timing of projection and non-projection of the second dot pattern DP2 is modulated with the code C2 as shown in a (B) portion of FIG. 8 will be described.

The light receiving elements arranged in a two-dimensional manner on the light receiving surface of the image sensor 14B of the imaging unit 14 are exposed in each of the projection period (T1, T3 in the drawing) of the first dot pattern and the non-projection period (T2, T4 in the drawing) of the first dot pattern. A first captured image obtained by imaging in the projection period of the first dot pattern and a second captured image obtained by imaging in the non-projection period of the first dot pattern are output from the imaging unit 14. The imaging unit 14 of this example outputs an analog imaging signal having a signal value corresponding to the amount of accumulated electric charge read from the light receiving elements as a captured image. The analog imaging signal is converted to a digital imaging signal by the AD converter 16, and is stored in the storage unit 32 by the interface circuit 18 as a captured image of digital data. The differential image generation unit 20D generates a differential image by subtracting a pixel value (corresponding to the amount of accumulated electric charge in the non-projection period) of the second captured image from a pixel value (corresponding to the amount of accumulated electric charge in the projection period) of the first captured image for each pixel position.

Figure 8:
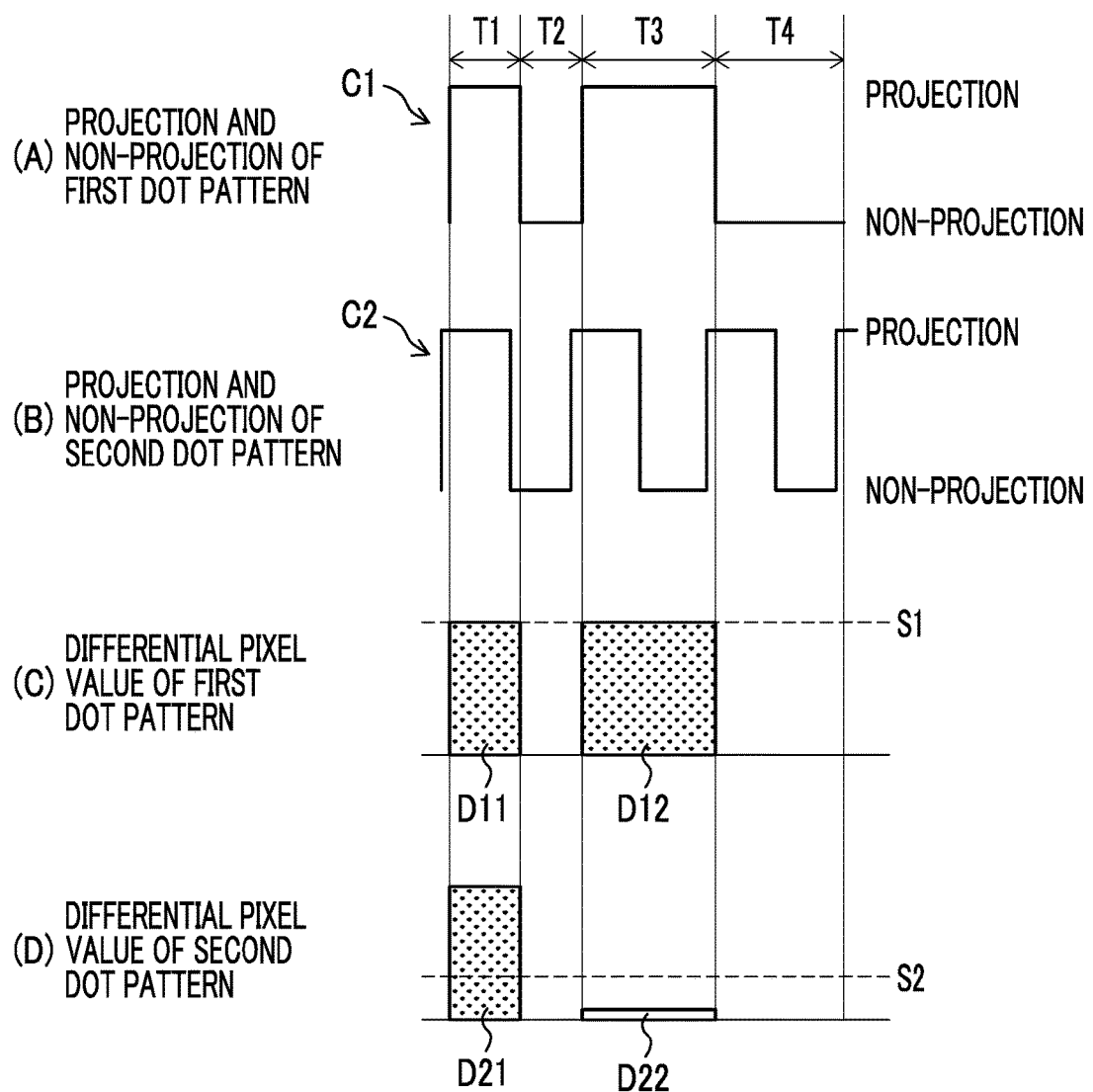
FIG. 8 is a first explanatory view illustrating the relationship of modulation of the switching timing of projection and non-projection of the pattern and a pixel value of a differential image in the first embodiment.

A (C) portion of FIG. 8 schematically shows values (differential pixel values D11, D12) of pixels corresponding to the first dot pattern DP1 in the differential image. The differential pixel value D11 corresponds to a value obtained by subtracting the exposure in the non-projection period T2 of the first dot pattern DP1 from the exposure in the projection period T1 of the first dot pattern DP1, and the differential pixel value D12 corresponds to a value obtained by subtracting the exposure in the non-projection period T4 of the first dot pattern DP1 from the exposure in the projection period T3 of the first dot pattern DP1. A (D) portion of the FIG. 8 shows values (differential pixel values D21, D22) of pixels corresponding to the second dot pattern DP2 in the differential image. The differential pixel value D21 corresponds to a value obtained by subtracting the exposure in the non-projection period T2 of the second dot pattern DP2 from the exposure in the projection period T1 of the second dot pattern DP2, and the differential pixel value D22 corresponds to a value obtained by subtracting the exposure in the non-projection period T4 of the second dot pattern DP2 from the exposure in the projection period T3 of the second dot pattern DP2.

As shown in the (C) portion of FIG. 8 and the (D) portion of FIG. 8, since the differential pixel value D11 and the differential pixel value D21 corresponding to the projection period T1 and the non-projection period T2 have a small difference, it is difficult to identify, from the differential pixel values D11 and D21, whether a pixel of the differential image is a pixel corresponding to the first dot pattern DP1 projected from the host apparatus or a pixel corresponding to the second dot pattern DP2 projected from another apparatus.

However, as shown in the (C) portion of FIG. 8 and the (D) portion of FIG. 8, since the differential pixel value D12 and the differential pixel value D22 corresponding to the projection period T3 and the non-projection period T4 have a large difference, it is possible to identify, from the differential pixel values D12 and D22, whether a pixel of the differential image is a pixel corresponding to the first dot pattern DP1 projected from the host apparatus or a pixel corresponding to the second dot pattern DP2 projected from another apparatus. That is, since the code of the switching timing of projection and non-projection is different between the first dot pattern DP1 and the second dot pattern DP2, the differential pixel values are integrated for each pixel position over the periods T1 to T4 corresponding to the code length of the code C1 of the host apparatus, thereby identifying the first dot pattern DP1. The code C1 indicates the switching timing of a plurality of projection periods T1 and T3 and a plurality of non-projection periods T2 and T4, and a plurality of projection periods T1 and T3 are different in time length (in this example, T1<T3). Furthermore, a plurality of non-projection periods T2 and T4 are different in time length (in this example, T2<T4).

The pattern extraction unit 20A of this example integrates the differential pixel values for each pixel position over the periods T1 to T4 corresponding to the code length of the code C1 of the host apparatus, for example. In the drawing, S1 and S2 are values corresponding to the integrated values. In a case where the integrated value is equal to or greater than a threshold, it can be determined that the differential pixel is a pixel of the first dot pattern, and in a case where the integrated value is less than the threshold, it can be determined that the differential pixel is not a pixel of the first dot pattern. That is, through comparison of the integrated value (D11+D12) of the differential pixel values D11 and D12 with the threshold, a pixel of the differential image is identified to be a pixel constituting the first dot pattern, and through comparison of the integrated value (D21+D22) of the differential pixel values D21 and D22 shown in the (D) portion of FIG. 8 with the threshold, a pixel of the differential image is identified to be not a pixel constituting the first dot pattern. S1 in FIG. 8 corresponds to the integrated value (D11+D12), and S2 in FIG. 8 corresponds to the integrated value (D21+D22). The first dot pattern may be extracted from the differential image by classifying a group of pixels, in which the integrated value of the differential pixel values is relatively large in the differential image, and a group of pixels, in which the integrated value of the differential pixel values is relatively small in the differential image, using a histogram, and determining the group of pixels, in which the integrated value of the differential pixel values is relatively large, to be a group of pixels of the first dot pattern.

Next, a case where the switching timing of projection and non-projection of the first dot pattern DP1 is modulated with the code C2 as shown in an (A) portion of FIG. 9, and the switching timing of projection and non-projection of the second dot pattern DP2 is modulated with the code C1 as shown in a (B) portion of FIG. 9 will be described.

Figure 9:
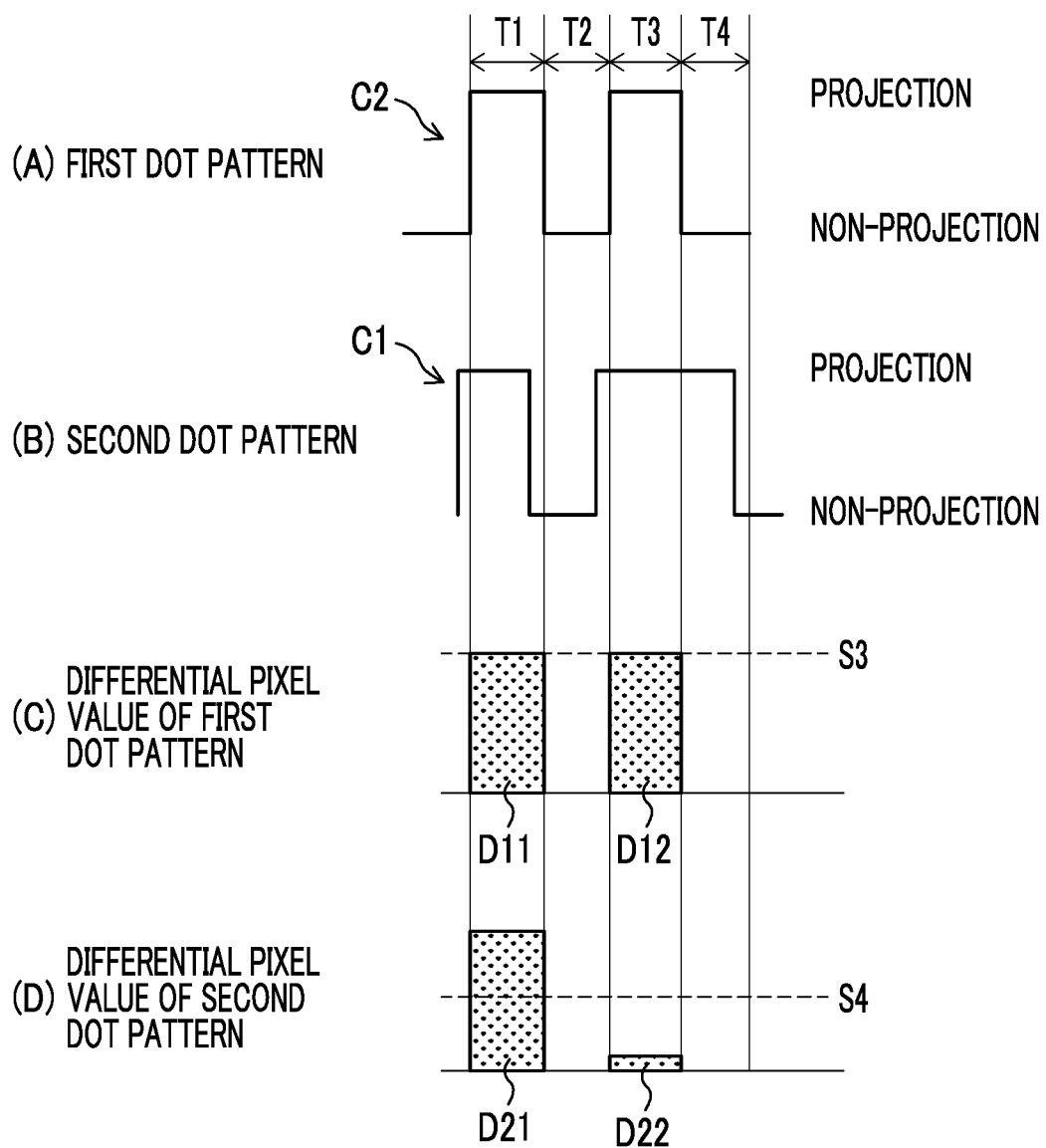
FIG. 9 is a second explanatory view illustrating the relationship of modulation of the switching timing of projection and non-projection of the pattern and the pixel value of the differential image in the first embodiment.

In a (C) portion of FIG. 9, the differential pixel values D11 and D12 correspond to the different in exposure between the projection period T1 and the non-projection period T2 of the first dot pattern DP1 and the difference in exposure between the projection period T3 and the non-projection period T4 of the first dot pattern DP1, respectively. In a (D) portion of FIG. 9, the differential pixel values D21 and D22 correspond to the difference in exposure between the projection period T1 and the non-projection period T2 of the second dot pattern DP2 and the difference in exposure between the projection period T3 and the non-projection period T4 of the second dot pattern DP2, respectively.

As shown in the (C) portion of FIG. 9 and the (D) portion of FIG. 9, since the differential pixel value D11 and the differential pixel value D21 corresponding to the projection period T1 and the non-projection period T2 have a small difference, it is difficult to identify, from the differential pixel values D11 and D21, whether a pixel of the differential image is a pixel corresponding to the first dot pattern DP1 or a pixel corresponding to the second dot pattern DP2.

However, as shown in the (C) portion of FIG. 9 and the (D) portion of FIG. 9, since the differential pixel value D12 and the differential pixel value D22 corresponding to the projection period T3 and the non-projection period T4 have a large difference, it is possible to identify, from the differential pixel values D12 and D22, whether a pixel of the differential image is a pixel of the first dot pattern projected from the host apparatus or a pixel of the second dot pattern projected from another apparatus.

The pattern extraction unit 20A of this example integrates the differential pixel values for each pixel position over the periods T1 to T4 corresponding to the code length of the code C2 of the host apparatus, for example. In the drawing, S3 and S4 are values corresponding to the integrated values. In a case where the integrated value is equal to or greater than the threshold, it can be determined that the differential pixel is a pixel of the first dot pattern, and in a case where the integrated value is less than the threshold, it can be determined that the differential pixel is not a pixel of the first dot pattern.

Figure 10:
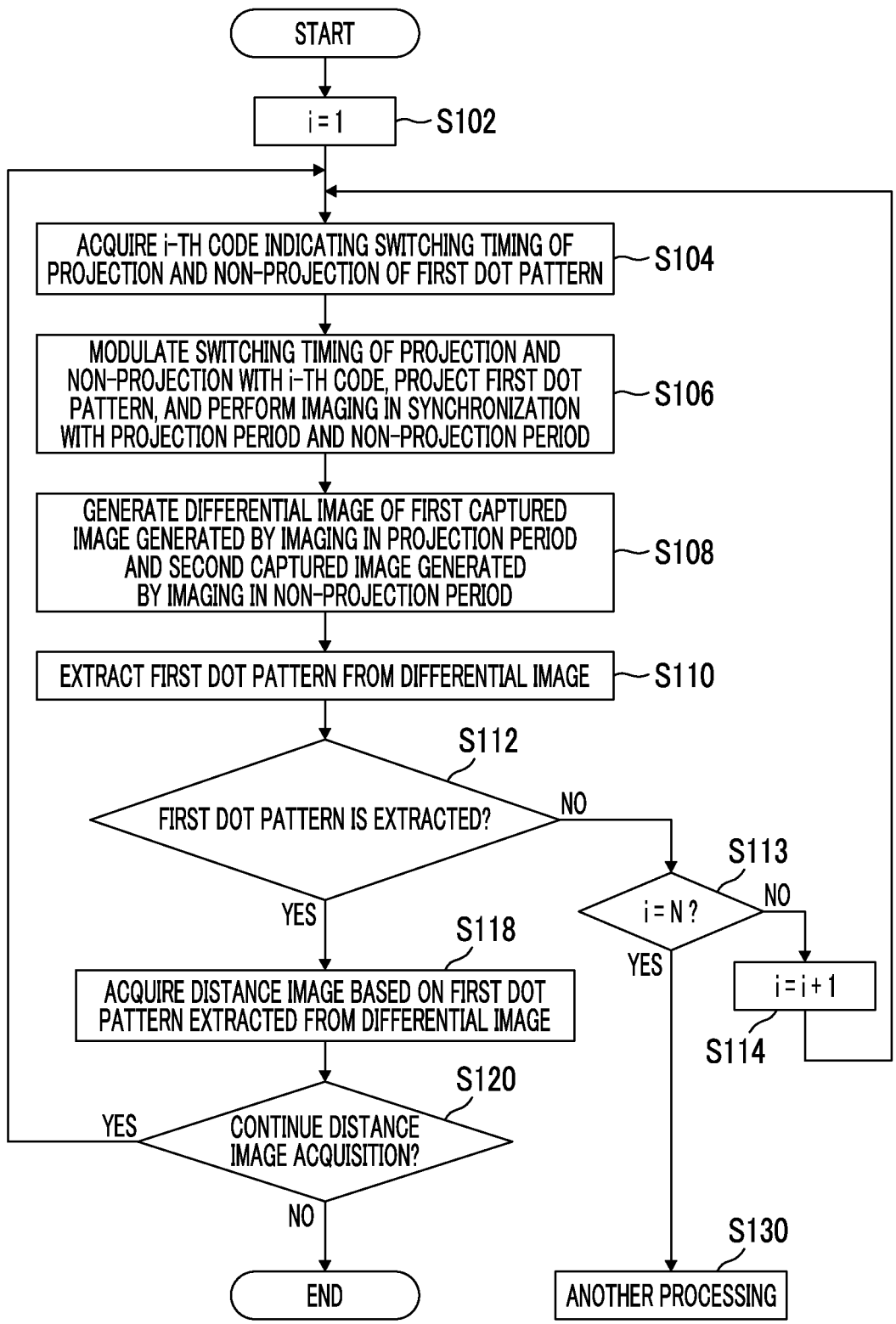
FIG. 10 is a flowchart showing the flow of processing of an example of a distance image acquisition method in the first embodiment.

FIG. 10 is a flowchart showing the flow of processing of an example of a distance image acquisition method in the first embodiment, and primarily shows the flow of processing which is executed according to a program under the control of the CPU 20. This processing is distance image acquisition processing in the video mode, and for example, starts in a case where the shutter button 11 is operated with one push.

First, the CPU 20 sets a variable i for identifying a code to "1" as an initial value (Step S102).

Next, the light modulation unit 22 is made to acquire an i-th code (Ci) indicating the switching timing of projection and non-projection of the first dot pattern from the code storage unit 22A (Step S104).

Next, the switching timing of projection and non-projection of the first dot pattern is modulated with the i-th code by the light modulation unit 22, the first dot pattern is projected from the projection unit 12 onto the subject within the distance measurement region, and the subject within the distance measurement region is imaged by the imaging unit 14 in synchronization with the projection period and the non-projection period of the first dot pattern (Step S106). A plurality of captured images including the first dot pattern reflected from the subject are output from the imaging unit 14. A plurality of captured images include a first captured image generated by imaging in the projection period of the first dot pattern and a second captured image generated by imaging in the non-projection period of the first dot pattern.

Next, a differential image of the first captured image obtained by imaging in the projection period and the second captured image obtained by imaging in the non-projection period is generated by the differential image generation unit 20D (Step S108).

Next, the first dot pattern is extracted from the differential image by the pattern extraction unit 20A (Step S110).

Next, it is determined whether or not the first dot pattern is actually extracted from the differential image (Step S112). In a case where it is determined that the first dot pattern is extracted (in a case of YES in Step S112), the distance image is acquired by the distance image acquisition unit 20B based on the first dot pattern extracted from the differential image (Step S118).

In a case where it is determined in Step S112 that the first dot pattern is not extracted (in a case of NO in Step S112), it is determined whether or not the variable i for identifying the code is equal to the number of codes N (Step S113). In a case of NO in Step S113, the variable i is incremented (i=i+1) (Step S114), and the process returns to Step S104. Then, the next code is acquired, and Steps S106 to S110 are repeated.

The CPU 20 determines whether or not to continue the distance image acquisition (Step S120), in a case where it is determined to continue the distance image acquisition (in a case of YES in Step S120), in this example, the variable i for identifying the code remains unchanged, and Steps S104 to S118 are repeated. In a case where it is determined not to continue the distance image acquisition (in a case of NO in Step S120), this processing ends. This processing is the distance image acquisition in the video mode, and ends in a case where the shutter button 11 is operated with one push again.

In a case where the first dot pattern is not extracted from the differential image with all codes, another processing is executed by the CPU 20 (Step S130). Usually, since the first dot pattern is extracted, Step S130 may be error processing.

Second Embodiment

Figure 11:
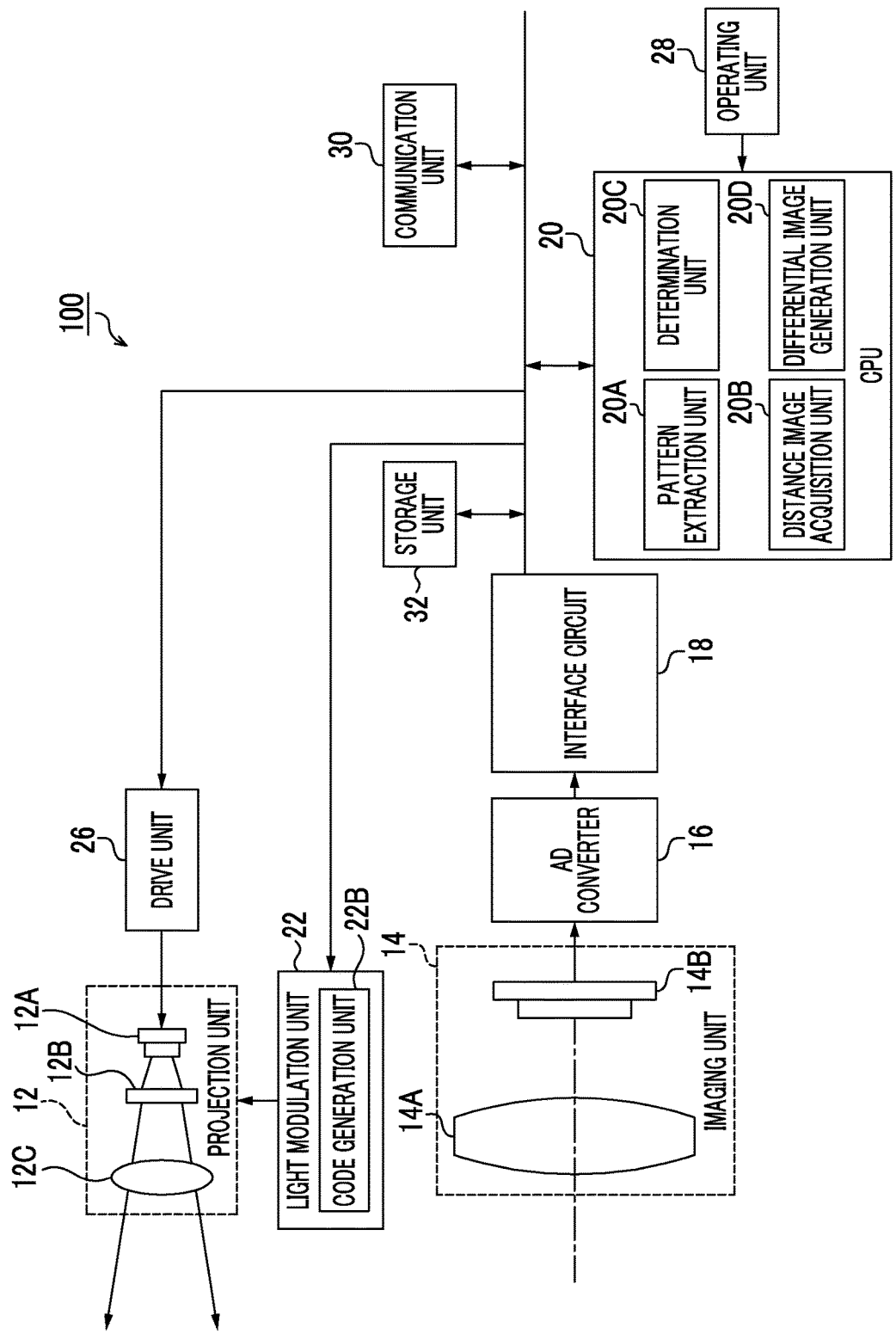
FIG. 11 is a block diagram showing an internal configuration example of a distance image acquisition apparatus of a second embodiment.

The internal configuration of a distance image acquisition apparatus 100 of a second embodiment will be described referring to FIG. 11. Hereinafter, a difference from the distance image acquisition apparatus 10 of the first embodiment shown in FIG. 3 will be primarily described, and the contents already described in the first embodiment will not be repeated.

The light modulation unit 22 of this embodiment modulates the switching timing of projection and non-projection of the first dot pattern with a random code.

The light modulation unit 22 comprises a code generation unit 22B which generates a random code. The light modulation unit 22 modulates the first dot pattern using the random code generated by the code generation unit 22B.

Figure 12:
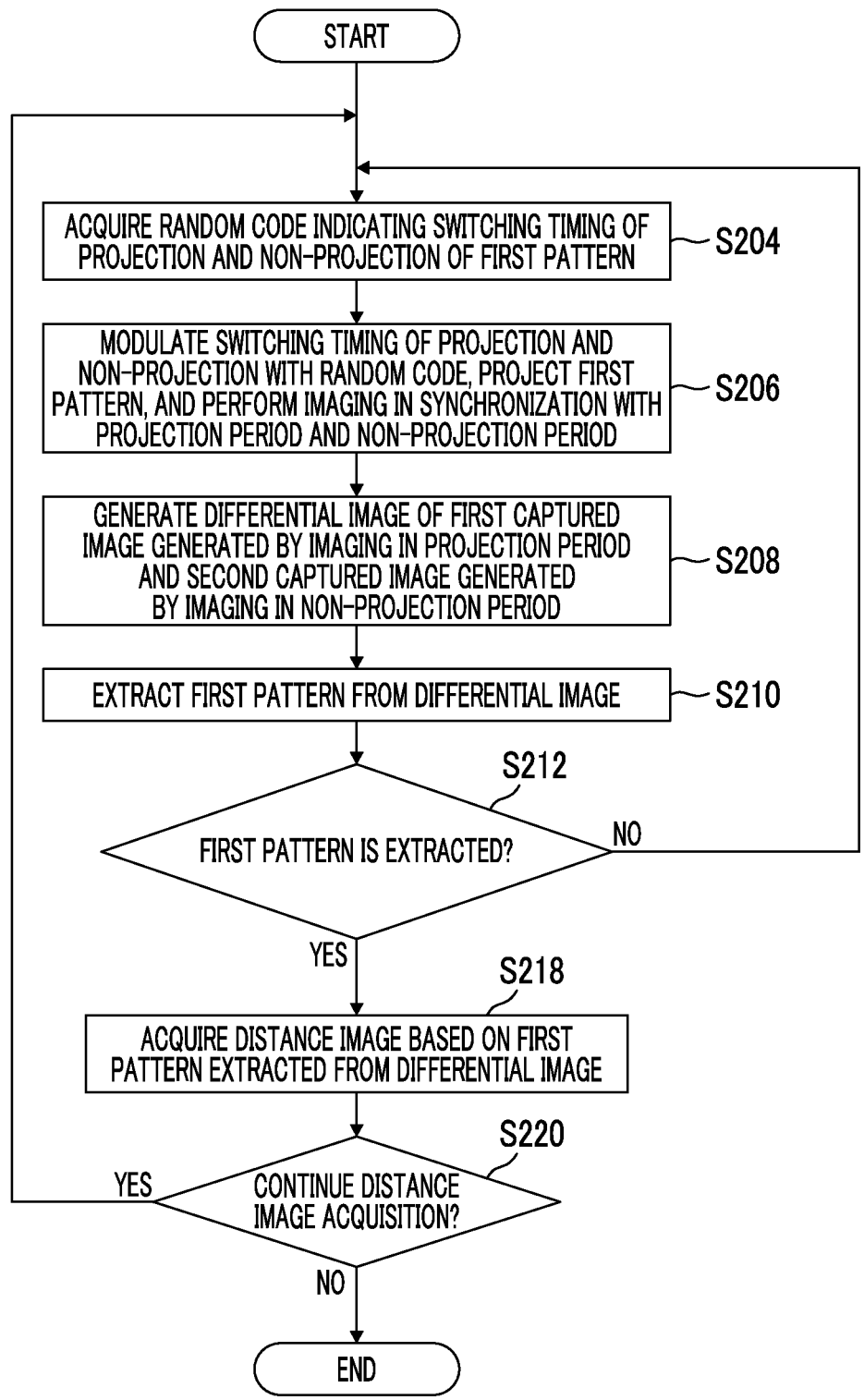
FIG. 12 is a flowchart showing the flow of processing of an example of a distance image acquisition method in the second embodiment.

FIG. 12 is a flowchart showing the flow of processing of an example of a distance image acquisition method of the second embodiment, and primarily shows the flow of processing which is executed according to a program under the control of the CPU 20. This processing is distance image acquisition processing in the video mode, and for example, starts in a case where the shutter button 11 is operated with one push.

First, the code generation unit 22B generates (acquires) a random code as a code indicating the switching timing of projection and non-projection of the first dot pattern (Step S204). A random code may be acquired by storing random codes in advance in the storage unit 32 and reading a random code from the storage unit 32.

Next, the switching timing of projection and non-projection of the first dot pattern is modulated with the random code by the light modulation unit 22, the first dot pattern is projected from the projection unit 12 onto the subject within the distance measurement region, and the subject within the distance measurement region is imaged by the imaging unit 14 in synchronization with the projection period and the non-projection period of the first dot pattern (Step S206). A plurality of captured images including the first dot pattern reflected from the subject are output from the imaging unit 14. A plurality of captured images include a first captured image generated by imaging in the projection period of the first dot pattern and a second captured image generated by imaging in the non-projection period of the first dot pattern.

Step S208 and Step S210 are the same as Step S108 and Step S110 of the first embodiment shown in FIG. 10, and description thereof will not be repeated.

It is determined whether or not the first dot pattern is actually extracted from the differential image (Step S212), and in a case where it is determined that the first dot pattern is extracted (in a case of YES in Step S212), a distance image is acquired by the distance image acquisition unit 20B based on the first dot pattern extracted from the differential image (Step S218).

In a case where it is determined in Step S112 that the first dot pattern is not extracted (in a case of NO in Step S212), the process returns to Step S204. Then, the next random code is acquired, and Steps S206 to S210 are repeated.

The CPU 20 determines whether or not to continue the distance image acquisition (Step S220), in a case where it is determined to continue the distance image acquisition (in a case of YES in Step S220), Steps S204 to S218 are repeated. In a case where it is determined not to continue the distance image acquisition (in a case of NO in Step S220), this processing ends. This processing is the distance image acquisition in the video mode, and ends in a case where the shutter button 11 is operated with one push again.

<Modulation Start Control>

For ease of understanding of this embodiment, although a case of modulation using a code regardless of the presence or absence of projection of the second dot pattern from another apparatus has been described as an example referring to FIGS. 10 and 12, the invention is not limited to such a case. It is preferable that the first dot pattern is not modulated with a code when the second dot pattern from another apparatus is not projected.

First, projection of the first dot pattern is performed by the projection unit 12 in the form of a continuous wave, and in a case where the determination unit 20C determines that the second dot pattern is not included in a captured image (that is, in a case where it is determined that the second dot pattern is not projected from another apparatus), a distance image is acquired based on the first dot pattern extracted from the captured image. Meanwhile, in a case where the determination unit 20C determines that the second dot pattern is included in the captured image (that is, in a case where it is determined that the second dot pattern is projected from another apparatus), it is preferable that the light modulation unit 22 starts code modulation of switching between the projection period and the non-projection period of the first dot pattern.

There are various determination aspects in which the determination unit 20C determines whether or not the second pattern is projected from another apparatus.

First, there is an aspect in which, in a case where the beacon information which is transmitted from another apparatus and indicates that the second dot pattern is projected from another apparatus is received by the communication unit 30, it is determined that the second dot pattern is projected another apparatus.

Second, there is an aspect in which, when the number of dots of a dot pattern detected from a captured image captured by the imaging unit 14 exceeds the number of dots of the first dot pattern projected from the projection unit 12, it is determined that the second dot pattern is projected from another apparatus.

<Code Length of Code>

The code length is not limited to the code lengths shown in FIG. 6. In the first embodiment, it is preferable that a plurality of codes having different code lengths are stored in the code storage unit 22A, the codes are used for modulation in a descending order of the code length, and in a case where a pattern cannot be extracted by the pattern extraction unit 20A, the light modulation unit 22 performs modulation while switching the code to a code having a longer code length. In the second embodiment, in a case where a pattern cannot be extracted by the pattern extraction unit 20A, it is preferable that the light modulation unit 22 generates a code having a longer code length with the code generation unit 22B and performs modulation.

<Video Mode and Static Image Mode>

In the video mode, the imaging unit 14 performs exposure in an exposure period corresponding to the frame rate of a continuous distance image, and the light modulation unit 22 modulates the switching timing of projection and non-projection of the first dot pattern in synchronization with start and end timings of the exposure period of the imaging unit 14.

The invention is not particularly limited to a case (video mode) of acquiring the continuous distance image, and can be carried out in a case (static image mode) of performing distance image acquisition for one frame.

An aspect to which the invention is applicable is not limited to a distance image acquisition apparatus having a single function of acquiring a distance image, and a general digital camera or a video camera which can capture a color image may have a distance image acquisition function. The invention is also applicable to mobile apparatuses which have, in addition to a distance image acquisition function, functions (a call handling function, a communication function, and other computer functions) other than the distance image acquisition function. As other aspects to which the invention is applicable, for example, mobile phones, smartphones, personal digital assistants (PDA), and portable game machines are exemplified. Hereinafter, an example of a smartphone to which the invention is applicable will be described.

<Configuration of Smartphone>

Figure 13:
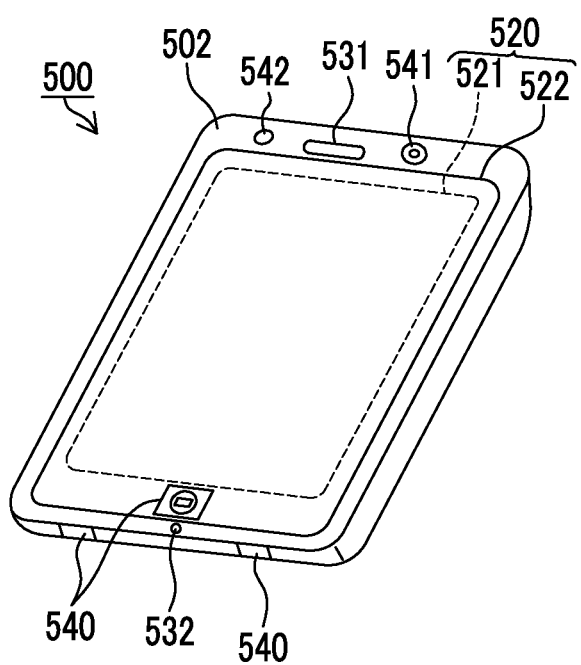
FIG. 13 is an appearance diagram of a smartphone which is an example of the distance image acquisition apparatus.

FIG. 13 is a perspective view showing the appearance of a smartphone 500 which is an embodiment of a distance image acquisition apparatus.

The smartphone 500 shown in FIG. 13 has a flat plate-shaped housing 502, and comprises a display input unit 520 in which a display panel 521 as a display unit and an operation panel 522 as an input unit are integrated on one surface of the housing 502. The housing 502 comprises a speaker 531, a microphone 532, an operating unit 540, a camera unit 541, and a projection unit 542. The configuration of the housing 502 is not limited thereto, and for example, a configuration in which the display unit and the input unit are independent from each other may be employed, or a configuration having a folding structure or a slide mechanism may be employed.

Figure 14:
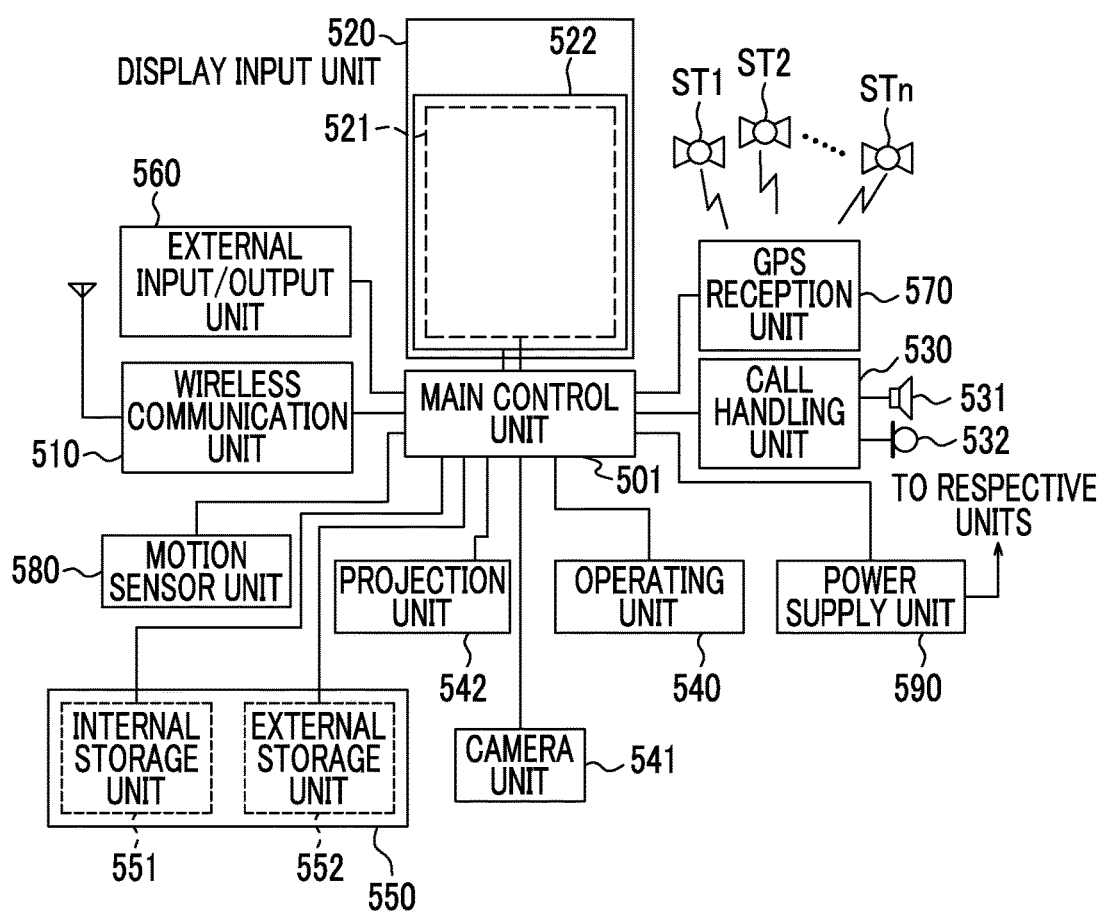
FIG. 14 is a block diagram showing the configuration of the smartphone.

FIG. 14 is a block diagram of the smartphone 500 shown in FIG. 13. As shown in FIG. 14, the smartphone 500 comprises, as principal components, a wireless communication unit 510, a display input unit 520, a call handling unit 530, an operating unit 540, a camera unit 541 functioning as an imaging unit, a storage unit 550, an external input/output unit 560, a global positioning system (GPS) reception unit 570, a motion sensor unit 580, a power supply unit 590, and a main control unit 501. The smartphone 500 has, as a principal function, a wireless communication function of performing mobile wireless communication through a base station device and a mobile communication network.

The wireless communication unit 510 performs wireless communication with the base station device in the mobile communication network according to an instruction of the main control unit 501. With the use of the wireless communication, transmission and reception of various kinds of file data, such as music data and image data, and electronic mail data, or reception of Web data, streaming data, or the like is performed.

The display input unit 520 is a so-called touch panel which displays images (static images and videos), text information, or the like to visually transfer information to the user and detects a user's operation on the displayed information under the control of the main control unit 501, and comprises the display panel 521 and the operation panel 522. In a case where a generated three-dimensional image is viewed, it is preferable that the display panel 521 is a three-dimensional display panel.

The display panel 521 uses a liquid crystal display (LCD), an organic electro-luminescence display (OELD), or the like as a display device.

The operation panel 522 is a device which is placed such that an image displayed on a display surface of the display panel 521 is visible, and detects one or a plurality of coordinates according to an operation with a user's finger or a stylus. In a case where the device is operated with the user's finger or the stylus, a detection signal generated due to the operation is output to the main control unit 501. Next, the main control unit 501 detects an operation position (coordinates) on the display panel 521 based on the received detection signal.

As shown in FIG. 13, although the display panel 521 and the operation panel 522 of the smartphone 500 are integrated to constitute the display input unit 520, the operation panel 522 is arranged so as to completely cover the display panel 521. In a case where this arrangement is employed, the operation panel 522 may have a function of detecting a user's operation even in a region outside the display panel 521. In other words, the operation panel 522 may have a detection region (hereinafter, referred to as a display region) for a superimposed portion overlapping the display panel 521 and a detection region (hereinafter, referred to as a non-display region) for an outer edge portion not overlapping the display panel 521 other than the display region.

Although the size of the display region may completely coincide with the size of the display panel 521, both of the size of the display region and the size of the display panel 521 are not necessarily made to coincide with each other. The operation panel 522 may have two sensitive regions including an outer edge portion and an inner portion other than the outer edge portion. The width of the outer edge portion is appropriately designed according to the size of the housing 502 or the like. As a position detection system which is employed in the operation panel 522, a matrix switching system, a resistive film system, a surface acoustic wave system, an infrared system, an electromagnetic induction system, an electrostatic capacitance system, and the like are exemplified, and any system may be employed.

The call handling unit 530 comprises the speaker 531 and the microphone 532, converts speech of the user input through the microphone 532 to speech data processable in the main control unit 501 and outputs speech data to the main control unit 501, or decodes speech data received by the wireless communication unit 510 or the external input/output unit 560 and outputs speech from the speaker 531. As shown in FIG. 13, for example, the speaker 531 and the microphone 532 can be mounted on the same surface as the surface on which the display input unit 520 is provided.

The operating unit 540 is a hardware key using a key switch or the like, and receives an instruction from the user. For example, the operating unit 540 is a push button type switch which is mounted on a lower surface below the display unit of the housing 502 of the smartphone 500, and is turned on in a case of being pressed with a finger or the like and is brought into an off state by restoration force of the panel or the like in a case where the finger is released.

The storage unit 550 stores a control program or control data of the main control unit 501, address data associated with the name, telephone number, and the like of a communication partner, data of transmitted and received electronic mail, Web data downloaded by Web browsing, and downloaded content data, and temporarily stores streaming data or the like. The storage unit 550 is constituted of an internal storage unit 551 embedded in the smartphone and an external storage unit 552 having a slot for a detachable external memory. Each of the internal storage unit 551 and the external storage unit 552 constituting the storage unit 550 is realized using a memory (for example, a Micro SD (Registered Trademark) memory, such as a flash memory type, a hard disk type, a multimedia card micro type, or a card type, or a storage medium, such as a random access memory (RAM) or a read only memory (ROM).

The external input/output unit 560 plays a role of an interface with all external devices connected to the smartphone 500, and is provided for direct or indirect connection to other external devices through communication or the like (for example, a universal serial bus or the like) or network (for example, the Internet, a wireless local area network (LAN), Bluetooth (Registered Trademark), radio frequency identification (RFID), infrared data association (IrDA), Ultra Wideband (UWB) (Registered Trademark), ZigBee (Registered Trademark), or the like).

The external devices connected to the smartphone 500 are, for example, a wired/wireless headset, a wired/wireless external charger, a wired/wireless data port, a memory card, a subscriber identity module (SIM) card, or a user identity module (UIM) card connected through a card socket, an external audio-video device connected through an audio-video input/output (I/O) terminal, an external audio-video device connected in a wireless manner, a smartphone connected in a wired or wireless manner, a personal computer connected in a wired/wireless manner, a PDA connected in a wired/wireless manner, an earphone, and the like. The external input/output unit can transfer data transmitted from the external devices to the respective components in the smartphone 500 or can transmit data in the smartphone 500 to the external devices.

The GPS reception unit 570 receives GPS signals transmitted from GPS satellites ST1 to STn according to an instruction of the main control unit 501, executes positioning calculation processing based on a plurality of received GPS signals, and detects the position of the smartphone 500 having latitude, longitude, and altitude. When position information can be acquired from the wireless communication unit 510 or the external input/output unit 560 (for example, a wireless LAN), the GPS reception unit 570 can detect the position using the position information.

The motion sensor unit 580 comprises, for example, a three-axis acceleration sensor or the like, and detects physical motion of the smartphone 500 according to an instruction of the main control unit 501. The moving direction or acceleration of the smartphone 500 is detected by detecting physical motion of the smartphone 500. The detection result is output to the main control unit 501.

The power supply unit 590 supplies electric power stored in a battery (not shown) to the respective units of the smartphone 500 according to an instruction of the main control unit 501.

The main control unit 501 is provided with a microprocessor, operates according to the control program or control data stored in the storage unit 550, and integrally controls the respective units of the smartphone 500. The main control unit 501 has a mobile communication control function of controlling respective units of a communication system in order to perform speech communication or data communication through the wireless communication unit 510, and an application processing function.

The application processing function is realized by the main control unit 501 operating according to application software stored in the storage unit 550. The application processing function is, for example, an infrared communication function of controlling the external input/output unit 560 to perform data communication with a device facing the smartphone 500, an electronic mail function of transmitting and receiving electronic mail, a Web browsing function of browsing Web pages, or the like.

The main control unit 501 has an image processing function of displaying video on the display input unit 520, or the like based on image data (static image or video data), such as received data or downloaded streaming data. The image processing function refers to a function of the main control unit 501 decoding image data, performing image processing on the decoding result, and displaying an image on the display input unit 520.

The main control unit 501 executes display control on the display panel 521 and operation detection control for detecting a user's operation through the operating unit 540 and the operation panel 522.

With the execution of the display control, the main control unit 501 displays an icon for activating application software or a software key, such as a scroll bar, or displays a window for creating electronic mail. The scroll bar refers to a software key for receiving an instruction to move a display portion of an image which is too large to fit into the display area of the display panel 521.

With the execution of the operation detection control, the main control unit 501 detects a user's operation through the operating unit 540, receives an operation on the icon or an input of text in an entry column of the window through the operation panel 522, or receives a scroll request of a display image through the scroll bar.

In addition, with the execution of the operation detection control, the main control unit 501 has a touch panel control function of determining whether or not an operation position on the operation panel 522 is the superimposed portion (display region) overlapping the display panel 521 or the outer edge portion (non-display region) not overlapping the display panel 521 other than the display region, and controlling the sensitive region of the operation panel 522 or the display position of the software key.

The main control unit 501 may detect a gesture operation on the operation panel 522 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 541 is an imaging device which performs electronic imaging using an image sensor, such as a complementary metal oxide semiconductor (CMOS) or a charge-coupled device (CCD).

In this case, it is preferable that the camera unit 541 has a plurality of light receiving elements having different wavelength bandwidths from each other provided in one image sensor, and light receiving elements (R pixel, G pixel, and B pixel) for color imaging mixed and arranged in a two-dimensional manner. That is, as an image sensor of the camera unit 541, an image sensor in which an R pixel, a G pixel, and a B pixel provided with color filters of RGB for color imaging and a pixel (a pixel having sensitivity only to projection light) provided with a band-pass filter or a cut filter for distance image acquisition are mixed is preferably used.

The projection unit 542 has an LED, and projects a first dot pattern of light at the time of acquisition of the distance image. In a case of the smartphone 500 having an optical communication function, the LED can be used as a light source of optical communication.

Under the control of the main control unit 501, the camera unit 541 can convert image data of visible light obtained by imaging to compressed image data in a format of, for example, Joint Photographic coding Experts Group (JPEG) or the like and can record compressed image data in the storage unit 550 or can output compressed image data through the external input/output unit 560 or the wireless communication unit 510, and similarly, can record the distance image indicating the distance of the subject in the storage unit 550 or can output the distance image through the external input/output unit 560 or the wireless communication unit 510. In the smartphone 500 shown in FIG. 13, although the camera unit 541 is mounted on the same surface as the display input unit 520, the mounting position of the camera unit 541 is not limited thereto, and the camera unit 541 may be mounted on a rear surface of the display input unit 520, or a plurality of camera units 541 may be mounted. In a case where a plurality of camera units 541 are mounted, the camera unit 541 for imaging may be switched to perform imaging alone, or a plurality of camera units 541 may be used simultaneously to perform imaging.

The camera unit 541 can be used for various functions of the smartphone 500. For example, an image acquired by the camera unit 541 can be displayed on the display panel 521, or an image in the camera unit 541 can be used as one operation input of the operation panel 522. In a case where the GPS reception unit 570 detects the position, the position may be detected with reference to an image from the camera unit 541. In addition, the optical axis direction of the camera unit 541 of the smartphone 500 may be determined or a current use environment may be determined with reference to an image from the camera unit 541 without using the three-axis acceleration sensor or using the three-axis acceleration sensor. Of course, an image from the camera unit 541 may be used within application software.

For example, the projection unit 542 may constitute a projection unit in the invention. For example, the camera unit 541 may constitute an imaging unit in the invention. For example, the main control unit 501 may constitute a determination unit, a differential image generation unit, a pattern extraction unit, and a distance image acquisition unit in the invention. Though not shown, a light modulation unit and a beacon information reception unit in the invention are provided in the smartphone 500.

The invention is not limited to the above-described embodiments, and it is needless to say that various modifications can be made without departing from the spirit of the invention.

EXPLANATION OF REFERENCES

10: distance image acquisition apparatus, 12: projection unit, 14: imaging unit, 16: AD converter, 18: interface circuit, 20: CPU, 20A: pattern extraction unit, 20B: distance image acquisition unit, 20C: determination unit, 20D: differential image generation unit, 22: light modulation unit, 22A: code storage unit, 22B: code generation unit, 26: drive unit, 28: operating unit, 30: communication unit, 32: storage unit

What is claimed is:

1. A distance image acquisition apparatus comprising:
a projector which projects a first pattern of structured light distributed in a two-dimensional manner with respect to a subject within a distance measurement region;
a light modulator which modulates a switching timing of projection and non-projection of the first pattern projected from the projector with a code;
an image sensor which is provided in parallel with and apart from the projector by a baseline length, performs imaging in synchronization with a projection period and a non-projection period of the first pattern, and generates a plurality of captured images including the first pattern reflected from the subject, the plurality of captured images including a first captured image captured in the projection period of the first pattern and a second captured image captured in the non-projection period of the first pattern;
a processor configured to:
generate a differential image of the first captured image captured in the projection period and the second captured image captured in the non-projection period;
extract the first pattern from the differential image;
acquire a distance image indicating a distance of the subject within the distance measurement region based on the first pattern;
determine whether or not a second pattern is projected from another distance image acquisition apparatus; and
a beacon information reception unit which receives beacon information transmitted from the another distance image acquisition apparatus, the beacon information indicating that the second pattern is projected from the another distance image acquisition apparatus,
wherein, in a case where the processor determines that the second pattern is projected from the another distance image acquisition apparatus, the light modulator performs modulation on the first pattern projected from the projector,
wherein, in a case where the beacon information reception unit receives the beacon information, the processor determines that the second pattern is projected from the another distance image acquisition apparatus.

2. The distance image acquisition apparatus according to claim 1,
wherein the light modulator modulates the switching timing of projection and non-projection of the first pattern with a random code.

3. The distance image acquisition apparatus according to claim 1,
wherein the image sensor performs exposure in an exposure period corresponding to a frame rate of the distance image, and
the light modulator modulates the switching timing of projection and non-projection of the first pattern in synchronization with start and end timings of the exposure period of the image sensor.

4. A distance image acquisition apparatus comprising:
a projector which projects a first pattern of structured light distributed in a two-dimensional manner with respect to a subject within a distance measurement region;
a light modulator which modulates a switching timing of projection and non-projection of the first pattern projected from the projector with a code;

an image sensor which is provided in parallel with and apart from the projector by a baseline length, performs imaging in synchronization with a projection period and a non-projection period of the first pattern, and generates a plurality of captured images including the first pattern reflected from the subject, the plurality of captured images including a first captured image captured in the projection period of the first pattern and a second captured image captured in the non-projection period of the first pattern;

a processor configured to:

generate a differential image of the first captured image captured in the projection period and the second captured image captured in the non-projection period;

extract the first pattern from the differential image;

acquire a distance image indicating a distance of the subject within the distance measurement region based on the first pattern and determine whether or not a second pattern is projected from another distance image acquisition apparatus, wherein, in a case where the processor determines that the second pattern is projected from the another distance image acquisition apparatus, the light modulator performs modulation on the first pattern projected from the projector, wherein the first pattern and the second pattern are dot patterns, wherein, when the number of dots of a dot pattern detected from a captured image captured by the image sensor exceeds the number of dots of the first pattern projected from the projector, the processor determines that the second pattern is projected from the another distance image acquisition apparatus.

5. A distance image acquisition method comprising:

a step of modulating a switching timing of projection and non-projection of a first pattern of structured light distributed in a two-dimensional manner with respect to a subject within a distance measurement region with a code and making a projector project the first pattern, a step of performing imaging in synchronization with a projection period and a non-projection period of the first pattern with an image sensor provided in parallel with and apart from the projector by a baseline length and generating a plurality of captured images including the first pattern reflected from the subject, the plurality of captured images including a first captured image captured in the projection period of the first pattern and a second captured image captured in the non-projection period of the first pattern;

a step of generating a differential image of the first captured image captured in the projection period and the second captured image captured in the non-projection period;

a step of extracting the first pattern from the differential image;

a step of acquiring a distance image indicating a distance of the subject within the distance measurement region based on the extracted first pattern;

a step of determining whether or not a second pattern is projected from another distance image acquisition apparatus;

a step of receiving beacon information transmitted from the another distance image acquisition apparatus, the beacon information indicating that the second pattern is projected from the another distance image acquisition apparatus;

in a case where it is determined that the second pattern is projected from the another distance image acquisition apparatus, a step of performing modulation on the first pattern projected from the projector; and in a case where the beacon information is received, a step of determining that the second pattern is projected from the another distance image acquisition apparatus.

6. A distance image acquisition method comprising:

a step of modulating a switching timing of projection and non-projection of a first pattern of structured light distributed in a two-dimensional manner with respect to a subject within a distance measurement region with a code and making a projector project the first pattern, a step of performing imaging in synchronization with a projection period and a non-projection period of the first pattern with an image sensor provided in parallel with and apart from the projector by a baseline length and generating a plurality of captured images including the first pattern reflected from the subject, the plurality of captured images including a first captured image captured in the projection period of the first pattern and a second captured image captured in the non-projection period of the first pattern;

a step of generating a differential image of the first captured image captured in the projection period and the second captured image captured in the non-projection period;

a step of extracting the first pattern from the differential image;

a step of acquiring a distance image indicating a distance of the subject within the distance measurement region based on the extracted first pattern;

a step of determining whether or not a second pattern is projected from another distance image acquisition apparatus;

in a case where it is determined that the second pattern is projected from the another distance image acquisition apparatus, a step of performing modulation on the first pattern projected from the projector, wherein the first pattern and the second pattern are dot patterns; and when the number of dots of a dot pattern detected from a captured image captured by the image sensor exceeds the number of dots of the first pattern projected from the projector, a step of determining that the second pattern is projected from the another distance image acquisition apparatus.

* * * * *